United States Patent [19]
Uchiyama et al.
[11] Patent Number: 5,015,537
[45] Date of Patent: May 14, 1991

[54] ORNAMENTAL MEMBER

[75] Inventors: Akira Uchiyama; Kiyohiro Imai, both of Suwa, Japan

[73] Assignee: Seiko Epson Corporation, Tokyo, Japan

[21] Appl. No.: 405,243

[22] Filed: Sep. 11, 1989

[30] Foreign Application Priority Data

| | | | |
|---|---|---|---|
| Sep. 12, 1988 | [JP] | Japan | 63-227812 |
| Sep. 13, 1988 | [JP] | Japan | 63-229612 |
| Jun. 9, 1989 | [JP] | Japan | 1-147721 |

[51] Int. Cl.[5] ............ B32B 15/04
[52] U.S. Cl. ............ 428/623; 428/627; 428/632; 428/336; 428/472; 428/698; 428/699
[58] Field of Search ............ 428/623, 627, 628, 629, 428/632, 660, 666, 667, 336, 472, 698, 699

[56] References Cited

U.S. PATENT DOCUMENTS

| | | | |
|---|---|---|---|
| Re. 32,111 | 4/1986 | Lambert et al. | 428/699 |
| 3,964,937 | 6/1976 | Post et al. | 428/699 |
| 4,101,703 | 7/1978 | Schintlmeister | 428/699 |
| 4,226,932 | 10/1980 | Ferraris | 428/623 |
| 4,720,437 | 1/1988 | Chudo et al. | 428/699 |
| 4,943,486 | 7/1990 | Uchiyama | 428/698 |

FOREIGN PATENT DOCUMENTS

| | | | |
|---|---|---|---|
| 2528255 | 2/1976 | Fed. Rep. of Germany | 428/698 |
| 70040 | 3/1987 | Japan | 428/698 |
| 1601224 | 10/1981 | United Kingdom | 428/698 |

*Primary Examiner*—Melvyn J. Andrews
*Assistant Examiner*—George Wyszomierski
*Attorney, Agent, or Firm*—Blum Kaplan

[57] ABSTRACT

An improved ornamental member including at least two types of Cr or Ti hard films of different color tones disposed by ion plating on a substrate is prepared. The laminate includes a combination of Cr and Ti hard films including a stainless steel colored Cr hard film layer containng Cr, N and C as the main constituents, a gold colored Ti hard film having Ti and N as the main constitutents, a dark grey Ti hard film having Ti, N and C as the main constituents, a blue Ti hard film having Ti and O as the main constituents and a brown Ti hard film having Ti, O and C as the main constituents. The thickness of a single year of hard film is between about 0.2 and 1.5 μm and the total film thickness at the laminated portion is less than about 3 μm. Preferably, each hard film layer is between about 0.2 and 0.8 μm.

21 Claims, 4 Drawing Sheets

FIG. 3
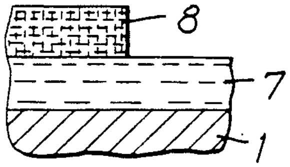
FIG. 4
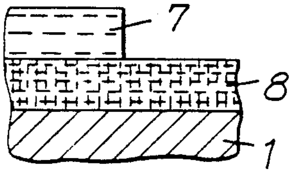
FIG. 5
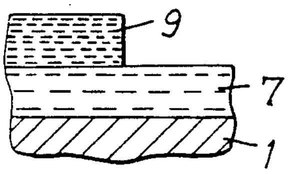
FIG. 6
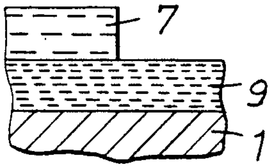
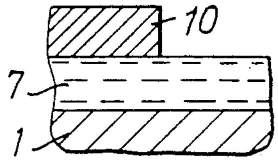
FIG. 7
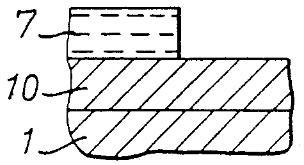
FIG. 8
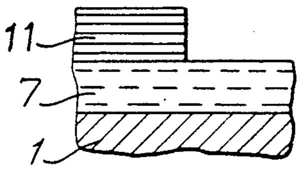
FIG. 9
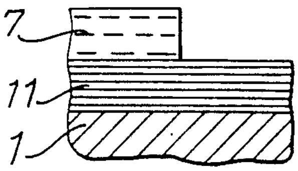
FIG. 10

ORNAMENTAL MEMBER

BACKGROUND OF THE INVENTION

This invention relates generally to an ornamental member produced by ion plating and more particularly to a multi-colored ornamental member formed of a combination of two hard films.

Conventional ornamental members, such as the exterior member of a watch with a multi-colored surface, include a stainless steel color and at least gold, dark grey, brown or blue. These generally are prepared by coating the surface of the ornamental member of a SUS material with a gold film produced by wet gold plating or ion plating, a dark grey film produced by wet rhodium or tin-nickel plating, or a brown film or a blue film produced by ion plating. A conventional exterior ornamental member of a watch with a two colored surface, including gold and brown or blue is generally produced by coating the surface of a substrate of the ornamental member with a gold film by gold or gold alloy wet plating and a brown or blue hard film produced by ion plating.

These conventional methods, however, suffer from poor scratch resistance, poor wear resistance and high cost. A partially exposed surface of a SUS material, which has a hardness of between about 140 and 180 Hv, is susceptible to scratching. A surface including a partial gold wet plated surface, which has a hardness of between about 200 and 300 Hv, is also susceptible to scratching. In order to enhance durability, it is necessary to increase the thickness of the layer of plating, which disadvantageously raises the cost of the article. A surface which is also partially wet plated with rhodium or tin-nickel is also susceptible to scratching. In addition, a rhodium plated surface is very expensive.

Accordingly, it is desirable to provide an improved ornamental member which eliminates these problems associated with the prior art and has good scratch resistance and wear resistance.

SUMMARY OF THE INVENTION

Generally speaking, in accordance with the invention, an improved ornamental member which has high ornamental value and hard surface has a substrate coated with a laminate of at least two hard films of Cr or Ti of different color tones by ion plating to form an ornamental member having a multi-colored surface. The laminate includes a combination of Cr and Ti hard films including a stainless steel colored Cr hard film layer containing Cr, N and C as the main constituents, a gold colored Ti hard film having Ti and N as the main constituents, a dark grey Ti hard film having Ti, N and C as the main constituents, a blue Ti hard film having Ti and 0 as the main constituents and a brown Ti hard film having Ti, 0 and C as the main constituents. The thickness of a single layer of the hard film is between about 0.2 and 1.5 $\mu$m and the total film thickness at the laminated portion is less than about 3 $\mu$m. Preferably, each hard film layer is between about 0.2 and 0.8 $\mu$m.

An ornamental member including one Cr hard film and one Ti hard film or two Ti hard film is formed by ion plating a first hard film on a substrate. A masking material is deposited in a pattern on the first hard film and a second hard film is ion plated on the first hard film and the masking material. The masking material is removed, removing the portion of the second hard film formed over it. Alternately, a first hard film is ion plated on the substrate and a second hard film is ion plated on the first hard film and the second hard film is partially removed by etching.

Accordingly, it is an object of this invention to provide an improved ornamental member having a multi-colored surface.

Another object of the invention is to provide an improved ornamental member having a high degree of hardness.

A further object of the invention is to provide an improved ornamental member with excellent scratch resistance, wear resistance and corrosion resistance.

A still further object of this invention is to provide an improved ornamental member with excellent adherence.

Yet a further object of this invention is to provide an improved ornamental member which is low in cost.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing, in which:

FIGS. 3–21 are sectional views of an ornamental member in accordance with further embodiments of the invention.

DESCRIPTION OF THE PREFERRED EMBODIMENTS

Figure 1A:
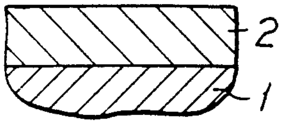
FIGS. 1(*a*), 1(*b*), 1(*c*) and 1(*d*) are sectional views illustrating the steps of preparing an ornamental member in accordance with an embodiment of the invention.
Figure 2A:
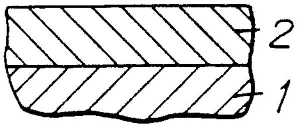
FIGS. 2(*a*), 2(*b*), 2(*c*) and 2(*d*) are sectional views illustrating the steps of preparing an ornamental member in accordance with another embodiment of the invention.
Figure 1B:
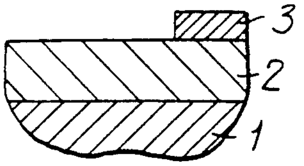
Figure 2B:
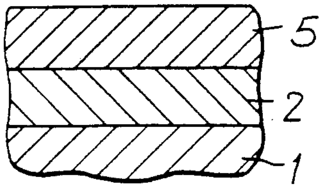
Figure 1C:
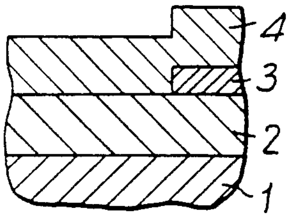
Figure 2C:
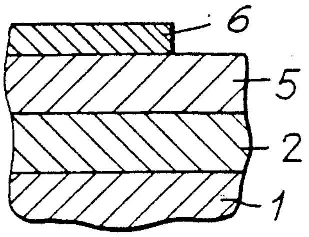
Figure 1D:
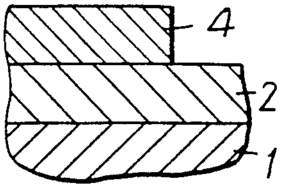
Figure 2D:
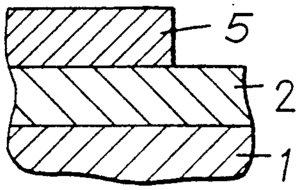

An ornamental member prepared in accordance with the invention is formed by a "second-layer ion plating method" or a "second-layer etching method". The ornamental member prepared by the second-layer ion plating method is shown in cross section in FIGS. 1(*a*)–1(*d*). A first hard film 2 is laminated on a substrate 1 by ion plating, as shown in FIG. 1(*a*). The laminate is baked and hardened. The portion of the surface of first hard film 2 intended to be visible is coated with an organic coating 3 to mask first hard film 2 as shown in FIG. 1(*b*).

A second hard film 4 is disposed across the upper surface by ion plating, as shown in FIG. 1(*c*). Substrate 1, including first hard film 2, inorganic coating 3 and second hard film 4, is immersed in an organic solvent to dissolve and remove inorganic coating 3 and the portion of second hard film 4 formed on inorganic coating 3. Thus, a two colored ornamental member including first hard film 2 and second hard film 4 is obtained as shown in FIG. 1(*d*).

Any material that can withstand the high temperature of ion plating may be used as substrate 1. For example.

substrate 1 may be formed from a ceramic material, a hard Ni-base alloy, a Co-base alloy, stainless steel, a copper alloy, brass, zinc, a zinc alloy or a plastic material. Preferably, substrate 1 is SUS 304.

It is necessary for substrate 1 to have sufficient corrosion resistance prior to coating with the hard film since most of the hard films produced by ion plating include pinholes. If substrate 1 does not have sufficient corrosion resistance, it is necessary to form at least one undercoat layer by plating prior to ion plating first layer hard film 2. If substrate 1 is formed from a ceramic material, a hard Ni-base alloy, a Co-base alloy, stainless steel or the like, substrate 1 has good corrosion resistance and an undercoat plating is not necessary. However, if substrate 1 is a stainless steel substrate containing a free-cutting ingredient such as sulfur, substrate 1 is slightly inferior in corrosion resistance. In this case, it is necessary to laminate a single or several gold-, gold alloy-, chromium-, palladium-, palladium alloy-, rhodium- or ruthenium-plated layers as an undercoat to obtain a substrate with sufficient corrosion resistance.

If substrate 1 is a copper alloy, zinc or a zinc alloy, it is necessary to deposit a single or several gold-, gold alloy-, chromium-, palladium-, palladium alloy-, rhodium- or ruthenium-plated layers after laminating a single or several copper, Ni or Ni alloy layers on substrate 1. If an undercoat of a copper alloy, zinc or a zinc alloy is formed on substrate 1 prior to ion plating, it is possible to prevent the substrate material from being exposed directly to high temperature and a high vacuum atmosphere during ion plating. Thus, a rise in the internal temperature of the substrate material and the formation of a blister from the dezincification is prevented.

If substrate 1 is a plastic material, it is generally treated with Ni by electroless plating prior to undercoat plating in a manner similar to the undercoat plating of a copper alloy, zinc or a zinc alloy substrate. Since plastic is an organic material having a low melting point, gas easily escapes due to a rise in temperature during ion plating, causing frequent defective adhesion with the ion plated film. Thus, undercoat plating is essential to prevent defective adhesion.

The undercoat plating is between about 0.2 and 20 $\mu$m thick. In terms of productivity and functional efficiency, the undercoat is preferably between about 2 and 10 $\mu$m thick when the undercoat is formed of a single layer or is multi-layered. However, there is no difference is quality when the thickness is between about 0.2 and 20 $\mu$m thick.

First hard film 2 and second hard film 4 are formed of compounds including Cr or Ti. For example, a stainless steel colored hard film may be formed of a material including Cr, N and C. A gold coated hard film may be formed of a material including Ti and N. A dark grey hard film may be formed of a material including Ti, N and C, or Cr, N, C and 0. A blue hard film may be formed of a material including Ti and 0. A brown colored hard film may be formed of a compound including Ti, C and 0.

To form a two colored ornamental member in accordance with the invention, a combination of Cr and Ti hard films is used. For example, first hard film 2 may be a stainless steel colored Cr hard film and second hard film 4 may be a gold, dark grey, brown or blue colored Ti hard film. Alternatively, first hard film 2 may be a gold, dark grey, brown or blue colored Ti hard film and second hard film 4 may be a stainless steel colored Cr hard film.

It is also possible to form a two colored ornamental member from a combination of Ti hard films. For example, first hard film 2 may be formed of a gold colored Ti hard film and second hard film 4 may be formed of a blue or brown colored Ti hard film. Alternatively, first hard film 2 may be formed of a blue or brown colored Ti hard film and second hard film 4 may be formed of a gold colored Ti hard film.

An ornamental member including three or more colors in accordance with the invention is formed by combining Cr hard films and Ti hard films having different color tones.

Although an ion-plated film provides a high degree of hardness, an increase in the thickness of the hard film results in an increase in internal stress. Thus, the film becomes unfavorably brittle. To secure the adherence required for the ornamental member, the thickness of a single layer of hard film is between about 0.2 and 1.5 $\mu$m and the total film thickness of the laminated portion is less than about 3 $\mu$m. Preferably, a single layer hard film has a thickness between about 0.2 and 0.8 $\mu$m. If a single layer of hard film is less than about 0.2 $\mu$m, the scratch resistance and wear resistance are inferior and predetermined tones cannot be formed. If the thickness of the laminated portion exceeds about 3 $\mu$m, the internal stress lowers the adherence and the film may separate.

The method of forming an ornamental member in accordance with the invention by the second layer etching method is shown in FIGS. 2(*a*)–2(*d*). The second layer etching method may be used when one film is a Cr hard film and the other film is a Ti hard film. The second-layer ion plating method may be used when both films are Ti hard films or when one film is a Ti hard film and the other film is a Cr hard film.

First hard film 2 is formed on substrate 1 by ion plating, as shown in FIG. 2(*a*). A second hard film 5 is formed on first hard film 2 by ion plating, as shown in FIG. 2(*b*). The laminate is baked and hardened and an organic coating 6 is deposited on the surface portion of second hard film 5 where second hard film 5 is intended to be visible on the finished exterior, as shown in FIG. 2(*c*).

Substrate 1 including first hard film 2, second hard film 5 and organic coating 6 is immersed in a remover which dissolves only second hard film 5. Second hard film 5 is dissolved and removed except for the portions where second hard film 6 is covered with organic coating 6. Substrate 1 is immersed in an organic solvent to remove organic coating 6. Thus, a two colored ornamental member in accordance with the invention formed by a combination of first hard film 2 and second hard film 5 is obtained, as shown in FIG. 2(*d*).

As described above, an ornamental member in accordance with the invention includes at least two hard films of different color tones laminated on a substrate by ion plating to form an exterior surface including a multiplicity of colors. The hardness of the substrate of the ornamental member is not less than 1000 Hv over the entire surface. Thus, the scratch resistance and wear resistance are superior to those of a conventional ornamental member.

The following examples are set forth by way of illustration to show preparation of ornamental members in accordance with the invention. They are set forth for purposes of illustration only, and not intended in a limiting sense.

EXAMPLES

One hundred samples, in the shape of an exterior member of a watch, having two different colored hard films and the structures shown in FIGS. 3 through 14 were prepared. Examples 1 through 60 show coated ornamental members prepared in accordance with preferred embodiments of the invention. Comparative Examples 1 through 40 are set forth for purposes of comparison.

In each example, a first hard film was ion plated on the substrate in the following manner. A substrate formed of SUS 304, brass or zinc in the shape of an exterior member of a watch, was inserted into an evacuated ion plating device. Argon gas was introduced into the device and ion bombardment was carried out for five minutes with a negative voltage of 0.5 kV applied to the substrate while maintaining the pressure at 0.02 torr. Thus, the surface of substrate 1 was cleaned.

Argon gas was discharged and the pressure of the vacuum chamber was restored to $1\times10^{-4}$ torr. Pure Ti or pure Cr was evaporated by electron beam heating, and a predetermined amount of a reaction gas was introduced to form a Ti or Cr hard film of an intermetallic compound of pure Ti or pure Cr and the reaction gas. The reaction gas was $N_2$ gas, $C_2H_2$ gas and $O_2$ or gas mixtures including at least one of these gases. The thickness of the hard film was controlled by the evaporation time of pure Ti or pure Cr and the tone of the hard film was controlled by the kind of metal evaporated (Cr or Ti) and the reaction gas.

In the samples in which the ornamental member was prepared by the second layer ion plating method, the first hard film formed in the above-described manner, was coated with an inorganic coating Heat Resistant Masking Material-D produced by Okuno Seiyaku K.K. at the portions where the first hard film was intended to be visible as the exterior coating. The inorganic coating was dried in the manner shown in Table 13.

A second hard film of Ti or Cr was ion plated over the first hard film and the inorganic coating material in the same manner as the first hard film was ion plated over the substrate. The inorganic coating layer was dissolved by Trichlene ultrasonic cleaning. The portions of the second hard film covering the inorganic coating were removed upon dissolution of the inorganic coating material to form the samples of the ornamental member of Tables 1-12.

In the samples in which the ornamental member was formed by the second layer etching method, the first hard layer was formed in the above-described manner by the ion plating method. A second hard film of Ti or Cr was ion plated over the first hard film in the same manner as the first hard film was ion plated over the substrate.

SPR-557W, an organic coating material produced by Sanei Kagaku K.K., was deposited on the second hard film at the portions where the first hard film was intended to be visible a the exterior coating. The organic coating was dried in accordance with the procedures specified in Table 13. The portions of the second hard film not covered by the organic coating were removed in accordance with the procedure shown in Table 14. The organic coating was removed by Trichlene ultrasonic cleaning to form the samples of the ornamental member of Tables 1-12.

When brass and zinc were used as a substrate it was necessary to undercoat plate the substrate. The structure and the thickness of the undercoat plating of the Examples of the ornamental member in accordance with the invention and the Comparative Examples is shown in Table 15.

The conditions used to produce the samples of Examples 1-6 and Comparative Examples 1-4 having the structures shown in FIG. 3, and the results of evaluating the samples are shown in Table 1. Each sample included a stainless steel colored Cr first hard film 7 and a gold colored Ti second hard film 8 disposed on substrate 1 of SUS 304, brass or zinc.

The conditions used to produce the samples of Examples 7-12 and Comparative Examples 5-8 having the structure shown in FIG. 4, and the results of evaluating the samples are shown in Table 2. Each sample included gold colored Ti first hard film 8 and stainless steel colored Cr second hard film 7 disposed on substrate 1 of SUS 304, brass or zinc.

The conditions used to produce the samples of Examples 13-18 and Comparative Examples 9-12 having the structure shown in FIG. 5, and the results of evaluating the samples are shown in Table 3. Each sample included stainless steel colored Cr first hard film 7 and a dark grey colored Ti second hard film 9 disposed on substrate 1 of SUS 304, brass or zinc.

The conditions used to produce the samples of Examples 19-24 and Comparative Examples 13-16 having the structure shown in FIG. 6, and the results of evaluating the samples are shown in Table 4. Each sample included dark grey colored Ti first hard film 9 and a stainless steel colored Cr second hard film 7 disposed on substrate 1 of SUS 304, brass or zinc.

The conditions used to produce the samples of Examples 25-30 and Comparative Examples 17-20 having the structure shown in FIG. 7, and the results of evaluating the samples are shown in Table 5. Each sample included stainless steel colored Cr first hard film 7 and a brown colored Ti second hard film 10 disposed on substrate 1 of SUS 304, brass or zinc.

The conditions used to produce the samples of Examples 31-36 and Comparative Examples 21-24 having the structure shown in FIG. 8, and the results of evaluating the samples are shown in Table 6. Each sample included brown colored Ti first hard film 10 and stainless steel colored Cr second hard film 7 disposed on substrate 1 of SUS 304, brass or zinc.

The conditions used to produce the samples of Examples 36-42 and Comparative Examples 25-28 having the structure shown in FIG. 9, and the results of evaluating the samples are shown in Table 7. Each sample included a stainless steel colored Cr first hard film 7 and a blue colored Ti second hard film 11 disposed on substrate 1 of SUS 304, brass or zinc.

The conditions used to produce the samples of Examples 43-48 and Comparative Examples 29-32 having the structure shown in FIG. 10, and the results of evaluating the samples are shown in Table 8. Each sample included blue colored Ti first hard film 11 and stainless steel colored Cr second hard film 7 disposed on substrate 1 of SUS 304, brass or zinc.

Figure 11:
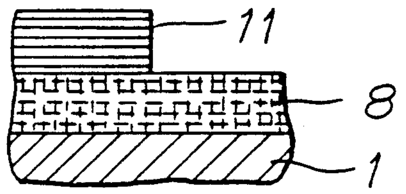

The conditions used to produce the samples of Examples 49-51 and Comparative Examples 33-34 having the structure shown in FIG. 11, and the results of evaluating the samples are shown in Table 9. Each sample included gold colored Ti first hard film 8 and blue colored Ti second hard film 11 disposed on substrate 1 of SUS 304, brass or zinc.

Figure 12:
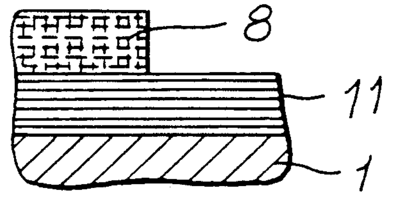

The conditions used to produce the samples of Examples 52–54 and Comparative Examples 35–36 having the structure shown in FIG. 12, and the results of evaluating the samples are shown in Table 10. Each sample included blue colored Ti first hard film 11 and a gold colored Ti second hard film 8 disposed on substrate 1 of SUS 304, brass or zinc.

Figure 13:
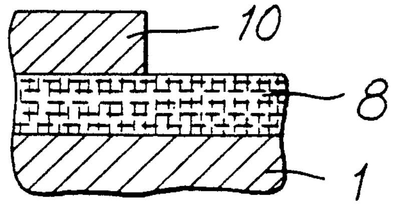

The conditions used to produce the samples of Examples 55–57 and Comparative Examples 37–38 having the structure shown in FIG. 13, and the results of evaluating the samples are shown in Table 11. Each sample included gold colored Ti first hard film 8 and brown colored Ti second hard film 10 disposed on substrate 1 of SUS 304, brass or zinc.

Figure 14:
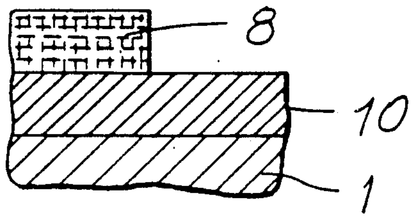
Figure 15:
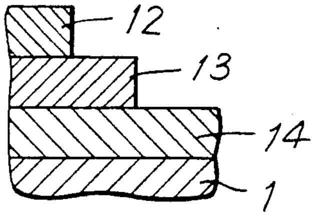

The conditions used to produce the samples of Examples 58–60 and Comparative Examples 58–60 having the structure shown in FIG. 14, and the results of evaluating the samples are shown in Table 12. Each sample included brown colored Ti first hard film 10 and gold colored Ti second hard film 8 disposed on substrate 1 of SUS 304, brass or zinc.

In Tables 1–12, "Processing time (min)" was the time required to deposit the metal of the evaporation source during ion plating. "Ratio" of gas is the ratio of the reaction gases used during ion plating. "Gas pressure" is the pressure in the vacuum tank in a stable state after the introduction of the reaction gases. Table 16 describes the criteria of properties evaluated in Tables 1–12.

TABLE 1

| | Example and Comparative Example No. | Invention 1 | 2 | 3 | 4 | 5 | 6 | Comparison 1 | 2 | 3 | 4 |
|---|---|---|---|---|---|---|---|---|---|---|---|
| | Method shown in | | FIG. 1 | | | FIG. 2 | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for first layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| Hard film for 2nd layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Gas introduced | $N_2$ | $N_2$ | $N_2$ | $N_2$ | $N_2$ | $N_2$ | $N_2$ | $N_2$ | $N_2$ | $N_2$ |
| | Gas · pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1250 | 1350 | 1000 | 1250 | 1350 | 1000 | 1400 | 900 | 1400 | 900 |
| | Tone | Gold | Deep gold | Light gold | Gold | Deep gold | Light gold | Gold | IFC* | Gold | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | | ◎ | Δ | ◎ | Δ | ◎ |
| | Wear resistance | ◎ | ◎ | ○ | ◎ | ◎ | | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | Δ | ◎ | Δ |

*IFC: Generation of an interference color

TABLE 2

| | Example and Comparative Example No. | Invention 7 | 8 | 9 | 10 | 11 | 12 | Comparison 5 | 6 | 7 | 8 |
|---|---|---|---|---|---|---|---|---|---|---|---|
| | Method shown in | | FIG. 1 | | | FIG. 2 | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat | No | Yes | Yes | No | Yes | Yes | No | Yes | No | Yes |

TABLE 2-continued

| | Example and Comparative Example No. | Invention 7 | 8 | 9 | 10 | 11 | 12 | Comparison 5 | 6 | 7 | 8 |
|---|---|---|---|---|---|---|---|---|---|---|---|
| | plating | | | | | | | | | | |
| Hard film for 1st layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Gas introduced | $N_2$ | $N_2$ | $N_2$ | $N_2$ | $N_2$ | $N_2$ | $N_2$ | $N_2$ | $N_2$ | $N_2$ |
| | Gas pressure ($\times 10^{-4}$ Torr) | 5 | 9 | 2 | 5 | 9 | 2 | 5 | 9 | 5 | 9 |
| | characteristics | | | | | | | | | | |
| | Thickness ($\mu$m) | 0.7 | 1.5 | 0.2 | 0.7 | 1.5 | 0.2 | 1.7 | 0.15 | 1.7 | 0.15 |
| | Hardness (Hv) | 1250 | 1350 | 1000 | 1250 | 1350 | 1000 | 1400 | 900 | 1400 | 900 |
| | Tone | Gold | Deep gold | Light gold | Gold | Deep gold | Light gold | Gold | IFC* | Gold | IFC* |
| Hard film for 2nd layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure ($\times 10^{-4}$ Torr) | 5 | 9 | 2 | 5 | 9 | 2 | 5 | 9 | 5 | 9 |
| | characteristics | | | | | | | | | | |
| | Thickness ($\mu$m) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | △ | ◎ | △ |
| | Adherence | ◎ | ○ | ◎ | ◎ | ○ | ◎ | △ | ◎ | △ | ◎ |
| | Wear resistance | ◎ | ◎ | ○ | ◎ | ◎ | ○ | ◎ | △ | ◎ | △ |
| | Corrosion resistance | | | | | | | | | | |
| | Artificial | ◎ | ◎ | ◎ | ◎ | ◎ | ◎ | ◎ | ◎ | ◎ | ◎ |
| | sweat | ◎ | ◎ | ◎ | ◎ | ◎ | ◎ | ◎ | ◎ | ◎ | ◎ |
| | Artificial | ◎ | ◎ | ◎ | ◎ | ◎ | ◎ | ◎ | ◎ | ◎ | ◎ |
| | Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | △ | ◎ | △ |

*IFC: Generation of an interference color

TABLE 3

| | Example and Comparative Example No. | Invention 13 | 14 | 15 | 16 | 17 | 18 | Comparison 9 | 10 | 11 | 12 |
|---|---|---|---|---|---|---|---|---|---|---|---|
| | Method shown in | | FIG. 1 | | | FIG. 2 | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for 1st layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness ($\mu$m) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| Hard film for 2nd layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |

TABLE 3-continued

| | Example and Comparative Example No. | Invention 13 | 14 | 15 | 16 | 17 | 18 | Comparison 9 | 10 | 11 | 12 |
|---|---|---|---|---|---|---|---|---|---|---|---|
| | Ratio of $N_2$:$C_2H_2$ | 1:5 | 1:5 | 1:5 | 1:5 | 1:5 | 1:5 | 1:5 | 1:5 | 1:5 | 1:5 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1300 | 1000 | 1200 | 1300 | 1000 | 1350 | 900 | 1350 | 900 |
| | Tone | Dark gray | Gray black | Light gray | Dark gray | Gray black | Light gray | Dark gray | IFC* | Dark gray | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | ○ | ◎ | Δ | ◎ | Δ | ◎ |
| | Wear resistance | ◎ | ◎ | ○ | ◎ | ◎ | ○ | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | Δ | ◎ | Δ |

*IFC: Generation of an interference color

TABLE 4

| | Example and Comparative Example No. | Invention 19 | 20 | 21 | 22 | 23 | 24 | Comparison 13 | 14 | 15 | 16 |
|---|---|---|---|---|---|---|---|---|---|---|---|
| | Method shown in | FIG. 1 | | | FIG. 2 | | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for 1st layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Ratio of $N_2$:$C_2H_2$ | 1:5 | 1:5 | 1:5 | 1:5 | 1:5 | 1:5 | 1:5 | 1:5 | 1:5 | 1:5 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1300 | 1000 | 1200 | 1300 | 1000 | 1350 | 900 | 1350 | 900 |
| | Tone | Dark gray | Gray black | Light gray | Dark gray | Gray black | Light gray | Dark gray | IFC* | Dark gray | IFC* |
| Hard film for 2nd layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | ○ | ◎ | Δ | ◎ | Δ | ◎ |
| | Wear resistance | ◎ | ◎ | ○ | ◎ | ◎ | ○ | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |

TABLE 4-continued

| Example and Comparative Example No. | Invention 19 | 20 | 21 | 22 | 23 | 24 | Comparison 13 | 14 | 15 | 16 |
|---|---|---|---|---|---|---|---|---|---|---|
| Hardness | ◎ | ◎ | ○ | ◎ | ◎ | ○ | ◎ | Δ | ◎ | Δ |

*IFC: Generation of an interference color

TABLE 5

| | Example and Comparative Example No. | Invention 25 | 26 | 27 | 28 | 29 | 30 | Comparison 17 | 18 | 19 | 20 |
|---|---|---|---|---|---|---|---|---|---|---|---|
| | Method shown in | | FIG. 1 | | | FIG. 2 | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for 1st layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| Hard film for 2nd layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Ratio of $N_2$:$C_2H_2$ | 3:1 | 3:1 | 3:1 | 3:1 | 3:1 | 3:1 | 3:1 | 3:1 | 3:1 | 3:1 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1350 | 1450 | 1100 | 1350 | 1450 | 1100 | 1500 | 900 | 1500 | 900 |
| | Tone | Brown | Dark brown | Light brown | Brown | Dark brown | Light brown | Brown | IFC* | Brown | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | ○ | ◎ | Δ | ◎ | Δ | ◎ |
| | Wear resistance | ◎ | ◎ | ○ | ◎ | ◎ | ○ | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | Δ | ◎ | Δ |

*IFC: Generation of an interference color

TABLE 6

| | Example and Comparative Example No. | Invention 31 | 32 | 33 | 34 | 35 | 36 | Comparison 21 | 22 | 23 | 24 |
|---|---|---|---|---|---|---|---|---|---|---|---|
| | Method shown in | | FIG. 1 | | | FIG. 2 | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for 1st layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Ratio of $N_2$:$C_2H_2$ | 3:1 | 3:1 | 3:1 | 3:1 | 3:1 | 3:1 | 3:1 | 3:1 | 3:1 | 3:1 |
| | Gas pressure | 5 | 9 | 2 | 5 | 9 | 2 | 5 | 9 | 5 | 9 |

TABLE 6-continued

| | Example and Comparative Example No. | Invention 31 | 32 | 33 | 34 | 35 | 36 | Comparison 21 | 22 | 23 | 24 |
|---|---|---|---|---|---|---|---|---|---|---|---|
| | (× $10^{-4}$ Torr) | | | | | | | | | | |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1350 | 1450 | 1100 | 1350 | 1450 | 1100 | 1500 | 900 | 1500 | 900 |
| | Tone | Brown | Dark brown | Light brown | Brown | Dark brown | Light brown | Brown | IFC* | Brown | IFC* |
| Hard film for 2nd layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure (× $10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | ○ | ◎ | Δ | ◎ | Δ | ◎ |
| | Wear resistance | ◎ | ◎ | ○ | ◎ | ◎ | ○ | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | Δ | ◎ | Δ |

*IFC: Generation of an interference color

TABLE 7

| | Example and Comparative Example No. | Invention 37 | 38 | 39 | 40 | 41 | 42 | Comparison 25 | 26 | 27 | 28 |
|---|---|---|---|---|---|---|---|---|---|---|---|
| | Method shown in | FIG. 1 | | | FIG. 2 | | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for 1st layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure (× $10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| Hard film for 2nd layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Gas introduced | $O_2$ | $O_2$ | $O_2$ | $O_2$ | $O_2$ | $O_2$ | $O_2$ | $O_2$ | $O_2$ | $O_2$ |
| | Gas pressure (× $10^{-4}$ Torr) | 5 | 9 | 2 | 5 | 9 | 2 | 5 | 9 | 5 | 9 |
| | Film characteristics | | | | | | | | | | |
| | Thickness | 0.7 | 1.5 | 0.2 | 0.7 | 1.5 | 0.2 | 1.7 | 0.15 | 1.7 | 0.15 |

TABLE 7-continued

| | Example and Comparative Example No. | Invention 37 | 38 | 39 | 40 | 41 | 42 | Comparison 25 | 26 | 27 | 28 |
|---|---|---|---|---|---|---|---|---|---|---|---|
| | (μm) | | | | | | | | | | |
| | Hardness (HV) | 1350 | 1450 | 1100 | 1350 | 1450 | 1100 | 1500 | 900 | 1500 | 900 |
| | Tone | Blue | Dark blue | Light blue | Blue | Dark blue | Light blue | Blue | IFC* | Blue | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | ○ | ◎ | Δ | ◎ | Δ | ◎ |
| | Wear resistance | ◎ | ◎ | ○ | ◎ | ◎ | ○ | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | Δ | ◎ | Δ |

*IFC: Generation of an interference color

TABLE 8

| | Example and Comparative Example No. | Invention 43 | 44 | 45 | 46 | 47 | 48 | Comparison 29 | 30 | 31 | 32 |
|---|---|---|---|---|---|---|---|---|---|---|---|
| | Method shown in | FIG. 1 | | | FIG. 2 | | | FIG. 1 | | FIG. 2 | |
| | Substrate material | SUS 304 | Brass | Zinc | SUS 304 | Brass | Zinc | SUS 304 | Brass | SUS 304 | Brass |
| | Undercoat plating | No | Yes | Yes | No | Yes | Yes | No | Yes | No | Yes |
| Hard film for 1st layer | Producing conditions | | | | | | | | | | |
| | Evaporation source | Ti | Ti | Ti | Ti | Ti | Ti | Ti | Ti | Ti | Ti |
| | Processing time (min) | 7 | 15 | 2 | 7 | 15 | 2 | 17 | 1.5 | 17 | 1.5 |
| | Gas introduced | $O_2$ | $O_2$ | $O_2$ | $O_2$ | $O_2$ | $O_2$ | $O_2$ | $O_2$ | $O_2$ | $O_2$ |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1350 | 1450 | 1100 | 1350 | 1450 | 1100 | 1500 | 900 | 1500 | 900 |
| | Tone | Blue | Dark blue | Light blue | Blue | Dark blue | Light blue | Blue | IFC* | Blue | IFC* |
| Hard film for 2nd layer | Producing conditions | | | | | | | | | | |
| | Evaporation source | Cr | Cr | Cr | Cr | Cr | Cr | Cr | Cr | Cr | Cr |
| | Processing time (min) | 7 | 15 | 2 | 7 | 15 | 2 | 17 | 1.5 | 17 | 1.5 |
| | Ratio of $N_2$:$C_2H_2$ | 1:1 | 1:1 | 1:1 | 1:1 | 1:1 | 1:1 | 1:1 | 1:1 | 1:1 | 1:1 |
| | Gas pressure ($\times 10^{-4}$ Torr) | 5 | 9 | 2 | 5 | 9 | 2 | 5 | 9 | 5 | 9 |
| | Film characteristics | | | | | | | | | | |
| | Thickness (μm) | 0.7 | 1.5 | 0.2 | 0.7 | 1.5 | 0.2 | 1.7 | 0.15 | 1.7 | 0.15 |
| | Hardness (HV) | 1200 | 1400 | 1000 | 1200 | 1400 | 1000 | 1450 | 900 | 1450 | 900 |
| | Tone | SUS color | SUS color | SUS color | SUS color | SUS color | SUS color | SUS color | IFC* | SUS color | IFC* |
| | Total film thickness | 1.4 | 3.0 | 0.4 | 1.4 | 3.0 | 0.4 | 3.4 | 0.3 | 3.4 | 0.3 |
| Evaluation | Tone | ◎ | ◎ | ○ | ◎ | ◎ | ○ | ◎ | Δ | ◎ | Δ |
| | Adherence | ◎ | ○ | ◎ | ◎ | ○ | ◎ | Δ | ◎ | Δ | ◎ |
| | Wear resistance | ◎ | ◎ | ○ | ◎ | ◎ | ○ | ◎ | Δ | ◎ | Δ |
| | Corrosion resistance | | | | | | | | | | |
| | Artificial sweat | ◎ | ◎ | ◎ | ◎ | ◎ | ◎ | ◎ | ◎ | ◎ | ◎ |
| | Artificial Sea water | ◎ | ◎ | ◎ | ◎ | ◎ | ◎ | ◎ | ◎ | ◎ | ◎ |
| | Hardness | ◎ | ◎ | ○ | ◎ | ◎ | ○ | ◎ | Δ | ◎ | Δ |

*IFC: Generation of an interference color

TABLE 9

| | Example and Comparative Example No. | Invention 49 | Invention 50 | Invention 51 | Comparison 33 | Comparison 34 |
|---|---|---|---|---|---|---|
| | Method shown in | FIG. 1 | | | FIG. 1 | |
| | Substrate material | SUS 304 | Brass | Zinc | SUS 304 | Brass |
| | Undercoat plating | No | Yes | Yes | No | Yes |
| Hard film for 1st layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Gas introduced | $N_2$ | $N_2$ | $N_2$ | $N_2$ | $N_2$ |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.15 |
| | Hardness (HV) | 1250 | 1350 | 1000 | 1400 | 900 |
| | Tone | Gold | Deep gold | Light gold | Gold | IFC* |
| Hard film for 2nd layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Gas introduced | $O_2$ | $O_2$ | $O_2$ | $O_2$ | $O_2$ |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.15 |
| | Hardness (HV) | 1350 | 1450 | 1100 | 1500 | 900 |
| | Tone | Blue | Dark blue | Light blue | Blue | IFC* |
| | Total film thickness | 1.4 | 3.0 | 0.4 | 3.4 | 0.3 |
| Evaluation | Tone | ◎ | ◎ | ○ | ◎ | Δ |
| | Adherence | ◎ | ○ | ◎ | Δ | ◎ |
| | Wear resistance | ◎ | ◎ | ○ | ◎ | Δ |
| | Corrosion resistance | | | | | |
| | Artificial sweat | ◎ | ◎ | ◎ | ◎ | ◎ |
| | Artificial Sea water | ◎ | ◎ | ◎ | ◎ | ◎ |
| | Hardness | ◎ | ◎ | ○ | ◎ | Δ |

*IFC: Interference color

TABLE 10

| | Example and Comparative Example No. | Invention 52 | Invention 53 | Invention 54 | Comparison 35 | Comparison 36 |
|---|---|---|---|---|---|---|
| | Method shown in | FIG. 1 | | | FIG. 1 | |
| | Substrate material | SUS 304 | Brass | Zinc | SUS 304 | Brass |
| | Undercoat plating | No | Yes | Yes | No | Yes |
| Hard film for 1st layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Gas introduced | $O_2$ | $O_2$ | $O_2$ | $O_2$ | $O_2$ |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.1 |
| | Hardness (HV) | 1350 | 1450 | 1100 | 1500 | 900 |
| | Tone | Blue | Dark | Light | Blue | IFC* |

TABLE 10-continued

| | Example and Comparative Example No. | Invention 52 | Invention 53 | Invention 54 | Comparison 35 | Comparison 36 |
|---|---|---|---|---|---|---|
| | | | blue | blue | | |
| Hard film for 2nd layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Gas introduced | $N_2$ | $N_2$ | $N_2$ | $N_2$ | $N_2$ |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.1 |
| | Hardness (HV) | 1250 | 1350 | 1000 | 1400 | 900 |
| | Tone | Gold | Deep gold | Light gold | Gold | IFC* |
| | Total film thickness | 1.4 | 3.0 | 0.4 | 3.4 | 0.3 |
| Evaluation | Tone | ◎ | ◎ | ○ | ◎ | Δ |
| | Adherence | ◎ | ○ | ◎ | Δ | ◎ |
| | Wear resistance | ◎ | ◎ | ○ | ◎ | Δ |
| | Corrosion resistance | | | | | |
| | Artificial sweat | ◎ | ◎ | ◎ | ◎ | ◎ |
| | Artificial | ◎ | | | | |
| | Sea water | ◎ | ◎ | ◎ | ◎ | ◎ |
| | Hardness | ◎ | ◎ | ○ | ◎ | Δ |

*IFC: Interference color

TABLE 11

| | Example and Comparative Example No. | Invention 55 | Invention 56 | Invention 57 | Comparison 37 | Comparison 38 |
|---|---|---|---|---|---|---|
| | Method shown in | | FIG. 1 | | FIG. 1 | |
| | Substrate material | SUS 304 | Brass | Zinc | SUS 304 | Brass |
| | Undercoat plating | No | Yes | Yes | No | Yes |
| Hard film for 1st layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Gas introduced | $N_2$ | $N_2$ | $N_2$ | $N_2$ | $N_2$ |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.15 |
| | Hardness (HV) | 1250 | 1350 | 1000 | 1400 | 900 |
| | Tone | Gold | Deep gold | Light gold | Gold | IFC* |
| Hard film for 2nd layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Ratio of $O_2$:$C_2H_2$ | 3:1 | 3:1 | 3:1 | 3:1 | 3:1 |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.15 |
| | Hardness (HV) | 1350 | 1450 | 1100 | 1500 | 900 |
| | Tone | Brown | Dark brown | Light brown | Brown | IFC* |
| | Total film thickness | 1.4 | 3.0 | 0.4 | 3.4 | 0.3 |
| Evaluation | Tone | ◎ | ◎ | ○ | ◎ | Δ |
| | Adherence | ◎ | ○ | ◎ | Δ | ◎ |

TABLE 11-continued

| | Example and Comparative Example No. | Invention 55 | 56 | 57 | Comparison 37 | 38 |
|---|---|---|---|---|---|---|
| | Wear resistance | ◎ | ◎ | ○ | ◎ | Δ |
| | Corrosion resistance | | | | | |
| | Artificial sweat | ◎ | ◎ | ◎ | ◎ | ◎ |
| | Artificial Sea water | ◎ | ◎ | ◎ | ◎ | ◎ |
| | Hardness | ◎ | ◎ | ○ | ◎ | Δ |

*IFC: Interference color

TABLE 12

| | Example and Comparative Example No. | Invention 58 | 59 | 60 | Comparison 39 | 40 |
|---|---|---|---|---|---|---|
| | Method shown in | | FIG. 1 | | FIG. 1 | |
| | Substrate material | SUS 304 | Brass | Zinc | SUS 304 | Brass |
| | Undercoat plating | No | Yes | Yes | No | Yes |
| Hard film for 1st layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Ratio of $O_2$:$C_2H_2$ | 3:1 | 3:1 | 3:1 | 3:1 | 3:1 |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.15 |
| | Hardness (HV) | 1350 | 1450 | 1100 | 1500 | 900 |
| | Tone | Brown | Dark brown | Light brown | Brown | IFC* |
| Hard film for 2nd layer | Producing conditions | | | | | |
| | Evaporation source | Pure Ti | Pure Ti | Pure Ti | Pure Ti | Pure Ti |
| | Processing time (min) | 7 | 15 | 2 | 17 | 1.5 |
| | Gas introduced | $N_2$ | $N_2$ | $N_2$ | $N_2$ | $N_2$ |
| | Gas pressure ($\times 10^{-4}$ Torr) | 5 | 9 | 2 | 5 | 9 |
| | Film characteristics | | | | | |
| | Thickness (μm) | 0.7 | 1.5 | 0.2 | 1.7 | 0.15 |
| | Hardness (HV) | 1250 | 1350 | 1000 | 1400 | 900 |
| | Tone | Gold | Deep gold | Light gold | Gold | IFC* |
| | Total film thickness | 1.4 | 3.0 | 0.4 | 3.4 | 0.3 |
| Evaluation | Tone | ◎ | ◎ | ○ | ◎ | Δ |
| | Adherence | ◎ | ○ | ◎ | Δ | ◎ |
| | Wear resistance | ◎ | ◎ | ○ | ◎ | Δ |
| | Corrosion resistance | | | | | |
| | Artificial sweat | ◎ | ◎ | ◎ | ◎ | ◎ |
| | Artificial Sea water | ◎ | ◎ | ◎ | ◎ | ◎ |
| | Hardness | ◎ | ◎ | ○ | ◎ | Δ |

*IFC: Interference color

TABLE 13

| | Trade name | Condition Drying | Removing |
|---|---|---|---|
| Organic coating | SPR-557W (Sanei Kagaku K.K.) | Natural drying 30 to 60 min Hot-air drying 150° C. 30 min | Trichlene ultrasonic cleaning |
| Inorganic | Heat-resistant | Natural | Trichlene |

TABLE 13-continued

| | Trade name | Condition Drying | Removing |
|---|---|---|---|
| coating | masking material-D (Okuno Seiyaku K.K.) | drying 30 to 60 min Hot-air drying 200° C. 60 min | ultrasonic cleaning |

TABLE 14

| Hard film | Condition | |
|---|---|---|
| | Composition of remover | Method |
| Ti hard film | 47% HF 1 vol<br>61% $HNO_3$ 1 vol | Temp.: normal temperature<br>Immersing time: 10 min. |
| Cr hard film | not less than 90% $H_3PO_4$ | Temp.: normal temperature<br>Anodic electrolysis: 5V · 5 min |

TABLE 15

| Sample | FIG. No. 3 | 4 | 5 | 6 | 7 | 8 | 9 | 10 | 11 | 12 | 13 | 14 | Structure and thickness of undercoat plating |
|---|---|---|---|---|---|---|---|---|---|---|---|---|---|
| Example No. | 2 | 8 | 14 | 20 | 26 | 32 | 38 | 44 | 50 | 53 | 56 | 59 | Cu(4 μm) + Ni(4 μm) + 80 wt % Pd—Ni (3 μm) |
| | 5 | 11 | 17 | 23 | 29 | 35 | 41 | 47 | | | | | Cu(4 μm) + Ni(4 μm) + 80 wt % Pd—Ni (3 μm) |
| | 3 | 9 | 15 | 21 | 27 | 33 | 39 | 45 | 51 | 54 | 57 | 60 | Cu(15 μm) + Ni(10 μm) + 80 wt % Pd—Ni (3 μm) |
| | 6 | 12 | 18 | 24 | 30 | 36 | 42 | 48 | | | | | Cu(15 μm) + Ni(10 μm) + 80 wt % Pd—Ni (3 μm) |
| Comparative | 2 | 6 | 10 | 14 | 18 | 22 | 26 | 30 | 34 | 36 | 38 | 40 | Cu(4 μm) + Ni(4 μm) + 80 wt % Pd—Ni (3 μm) |
| Example No. | 4 | 8 | 12 | 16 | 20 | 24 | 28 | 32 | | | | | Cu(15 μm) + Ni(10 μm) + 80 wt % Pd—Ni (3 μm) |

Criteria of properties evaluated in Tables 1 to 12 are shown in Table 16.

TABLE 16

| Properties Mark | Tone | Wear resistance | Adherence | Corrosion resistance | Hardness (HV) |
|---|---|---|---|---|---|
| ◎ | Intended tone | Not worn | No separation | No corrosion | Not less than 1200 |
| ○ | Substantially intended tone | Little worn No exposure | Almost no separation | Almost no corrosion | Less than 1200 to not less than 1000 |
| Δ | Slight deviation from intended tone | Partial exposure of material | Slight or partial separation | Slight or partial corrosion | Less than 1000 to not less than 900 |
| × | Considerable deviation from intended tone | Exposure of material over the entire surface | Separation over the entire or considerable portion | Corrosion over the entire or considerable portion | Less than 900 |

The thicknesses of the ion-plated films were determined using x-ray analysis. The tone visibly was judged and hardness was measured by a micro Vickers hardness testing machine with a load of 10 g. In order to examine wear resistance, the side surface of a watch case was reciprocated 30,000 times, at a stroke of 10 cm, while applying a load of 500 g to the watch case in close contact with cow leather. The degree of wear of the side surface of watch case was observed and recorded.

A compression load was applied to the watch case from both ends by a vice to bend an ornamental member in the shape of a watch exterior member. The bent portion had an angle of not less than 90°, and the degree of separation of the hard film at the bent portion was examined to determine adherence. To measure resistance to corrosion the ornamental member was immersed in artificial sweat and artificial sea water (3% NaCl) for twenty hours at a temperature of 40° C. and a humidity of 90%. Corrosion and color change were examined.

In Examples 1-60 showing ornamental members prepared in accordance with the invention, each ornamental member including a Cr hard film and a Ti hard film included two color tones having high ornamental value. No corrosion was observed in the corrosion resistance tests using artificial sweat and artificial sea water.

In the adherence test, the adherence was sufficient for an exterior member of a watch in each of Examples 1-60. When the thickness of a single layer of a hard film exceeded 1.5 μm and the total film thickness exceeded 3.0 μm, as in Comparative Examples 1, 3, 5, 7, 9, 11, 13, 15, 17, 19, 21, 23, 25, 27, 29, 31, 33, 35, 37 and 39, the adherence was reduced and partial separation between the hard films was observed. Thus, a single layer of hard film is preferably not more than about 1.5 μm to obtain sufficient adherence.

On the other hand, when the thickness of single layer or a hard film was less than 0.2 μm, as in Comparative Examples 2, 4, 6, 8, 10, 12, 14, 16, 18, 20, 22, 24, 26, 28, 30, 32, 34, 36, 38 and 40, an interference color, color shading or partial color change occurred, and it was impossible to achieve external tone stability. In addition, it was not possible to obtain the necessary wear resistance from a hard film less than about 0.2 μm since such a thin film does not have a hardness of 1000 Hv. Thus, the thickness of a single layer of hard film is between about 0.2 and 1.5 μm and preferably between about 0.2 and 0.8 μm to obtain sufficient adherence, tone stability and wear resistance.

When the surface of an ornamental member prepared in accordance with the invention is subject to various treatments, such as stripe patterning, check patterning, pear-skin patterning and mirror polishing, and hard films are formed thereon in accordance with the invention, the exterior can also present the same ornamentality of the surface treatment as the surface with no hard films formed thereon. If a hard film is further subjected to polishing by a polishing disk or the like, it is possible to produce lustrous exterior with high ornamentality. The surface of the polished hard film has a hardness of not less than 1000 Hv, and no exposure of the material was observed in wear resistance test.

In Examples 1-60, the general tendency was that the tone became darker with an increase in gas pressure, while the tone became lighter with a drop in gas pressure. However, the variation was small enough to judge the tones as identical in external appearance. Thus, the ornamental members prepared in accordance with the invention can be used as an exterior member for all parts or specifics parts of a watch.

Ion plating was carried out under constant conditions to control and maintain a constant tone of the hard film in Examples 1-60 set forth in Tables 1-12. Thus, the type of reaction gas, gas flow ratio, the gas pressure, the amount of evaporation of Ti or Cr and the processing time were kept constant. When ten samples formed separately from each other under the same conditions were compared visually and by color-difference meter, no difference was observed. Thus, the method of forming an ornamental member in accordance with the invention has high repetitional precision.

In another embodiment of the invention, a multi-colored ornamental member includes three or more color tones on a substrate as illustrated in FIGS. 15-21. A Cr or Ti hard film 12 of a color A, a Cr or Ti hard film 13 of a color B, a Cr or Ti hard film 14 of a color C and a Cr or Ti hard film 15 of a color D are laminated on substrate 1.

In particular, hard film 12 may be a Ti hard film, hard film 13 may be a Ti hard film of a different color than that of hard film 12, hard film 14 may be a Cr hard film and hard film 15 may be a Ti hard film of a different color than that of hard films 12 and 13.

A gold colored hard film may be formed of a material including Ti and N, a dark grey hard film may be formed of a material including Ti, N and C, a blue hard film may be formed of a material including Ti and O and a brown colored hard film may be formed of a compound including Ti, C and O. A stainless steel colored hard film may be formed of a material including Cr, N and C. Each of the hard films described above may be used to form the multi-colored ornamental member in accordance with the invention. Appropriate combinations of the second-layer ion plating method shown in FIG. 1 and the second-layer etching method shown in FIG. 2 easily produce ornamental members including three visible color tones under the same conditions as those described in Tables 1-12. Corrosion resistance, wear resistance, color tone and adherence are all satisfactory.

Figure 18:
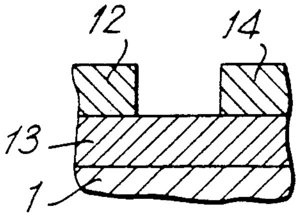
Figure 16:
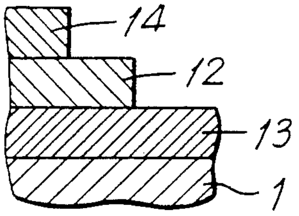
Figure 19:
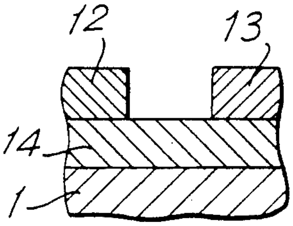
Figure 17:
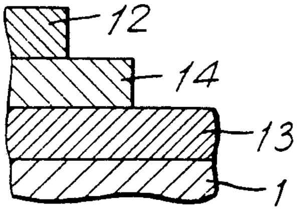
Figure 20:
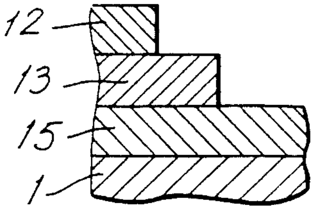
Figure 21:
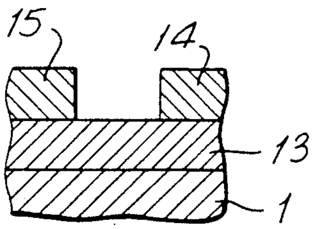

In the embodiments depicted in FIGS. 18, 19 and 21, when the total thickness of the three hard films exceeded about 3.0 μm, the adherence of the three layered portion was lowered in the same manner as in Comparative Examples 1, 3, 5, 7, 9, 11, 13, 15, 17, 19, 21, 23, 25, 27, 29, 31, 33, 35, 37, and 39. Thus, the thickness of each hard film is between about 0.2 and 1.5 μm. Preferably, the thickness of each hard layer is between about 0.2 and 0.8 μm.

The method for forming an ornamental member in accordance with the invention is not limited to exterior members of watches. Ornaments and accessories, including frames for glasses, lighter cases, ornamental bands, buckles, tiepins, rings and utensils, may be formed by the above-described method. In sum, an ornamental member in accordance with the invention includes at least two hard films of different colors to create a multi-colored exterior surface. The hard films have a hardness of not less than about 1000 Hv and include a stainless steel colored film, a gold colored film, a dark grey film, a blue film and a brown film.

High ornamental and functional value is obtained by a combination of hard films of at least two colors, including gold and brown, gold and blue, stainless steel and gold, stainless steel and dark grey, and stainless steel and brown. The adherence of the hard layers to the substrate and to each other, and the scratch resistance, the wear resistance and the corrosion resistance are superior to those of a conventional ornamental member.

In a first method of forming an ornamental member in accordance with the invention, including one Cr hard film and one Ti hard film or two Ti hard film, a first hard film is ion plated on a substrate. A heat resistant masking material is deposited in a pattern on the first hard film and baked and a second hard film is ion plated on the first hard film and the masking material. The masking material is removed, removing the portion of the second hard film formed over it. It is possible to choose the structures of the hard films to reduce the masking area and the masking time, thus, reducing the cost.

In a second method for forming an ornamental member in accordance with the invention, including one Cr hard film and one Ti hard film, a first hard film is ion plated on a substrate. A second hard film is ion plated on the first hard film and the second hard film is partially removed by etching. However, when two Ti hard films of different colors are used as the first hard film and the second hard film, it is difficult to form an ornamental member in accordance with the invention using the second-layer etching method.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An ornamental member, comprising:

a substrate;

a first hard film having a hardness of at least about 1000 HV deposited on said substrate; and a second hard film having a hardness of at least about 1000 HV selectively deposited on said first hard film so that portions of the first hard film are exposed, said first hard film and said second hard film having different color tones, at least one of said first hard film and said second hard film is a Ti containing ceramic and the other of said first hard film and said second hard film is selected from the group consisting of a Cr containing ceramic.

2. The ornamental member of claim 1, wherein said Cr containing ceramic film contains Cr, N and C.

3. The ornamental member of claim 1, wherein said Ti to containing ceramic are selected from the group consisting of:

a hard film containing Ti and N;

a hard film containing Ti, N and C, a hard film containing Ti and O, and a hard film containing Ti, O and C.

4. The ornamental member of claim 1, wherein said first hard film is between about 0.2 and 1.5 μm thick and said second hard film is between about 0.2 and 1.5 μm thick.

5. The ornamental member of claim 4, wherein said first hard film is between about 0.2 and 0.8 μm thick and said second hard film is between about 0.2 and 0.8 μm thick.

6. The ornamental memeber of claim 1, wherein said ornamental member presents two color tones and one of said color tones is the color of said first hard film and the other of said color tones is the color tone of said second hard film.

7. The ornamental member of claim 1, further including a third hard film selectively deposited on said second hard film, said third hard film selected from the group consisting of a Cr containing film and a Ti containing ceramic film.

8. The ornamental member of claim 7, wherein said first hard film is between about 0.2 and 1.0 μm thick, said second hard film is between about 0.2 and 1.0 μm thick and said third hard film is between about 0.2 and 1.0 μm thick.

9. The ornamental member of claim 8, wherein said first hard film is between about 0.2 and 0.8 μm thick, said second hard film is between about 0.2 and 0.8 μm thick and said third hard film is between about 0.2 and 0.8 μm thick.

10. The ornamental member of claim 1, further including a third hard film selectively deposited on said first hard film at a portion at which said second hard film is not deposited on said first hard film.

11. The ornamental member of claim 10, wherein said first hard film is between about 0.2 and 1.5 μm thick, said second hard film is between about 0.2 and 1.5 μm thick, and said third hard film is between about 0.2 and 1.5 μm thick.

12. The ornamental member of claim 11, wherein said first hard film is between about 0.2 and 0.8 μm thick, said second hard film is between about 0.2 and 0.8 μm thick and said third hard film is between about 0.2 and 0.8 μm thick.

13. The ornamental member of claim 1, wherein said first hard film is said Cr containing ceramic film and said second hard film is said Ti containing ceramic film.

14. The ornamental member of claim 1, wherein said first hard film is a Ti containing ceramic film and said second hard film is a Cr containing film.

15. The ornamental member of claim 1, wherein said first hard film and said second hard film are Ti containing ceramic films.

16. The ornamental member of claim 1, further including at least one layer of undercoat plating deposited on said substrate, said undercoat plating selected from the group consisting of gold, gold alloy, chromium, palladium, palladium alloy, rhodium and ruthenium and combinations thereof with said first hard film deposited on said undercoat plating.

17. The ornamental member of claim 1, further including at least one layer of a pre-undercoat plating, deposited on the substrate selected from the group consisting of copper, Ni and Ni alloy, and at least one layer of undercoat plating deposited on said pre-undercoat plating, said undercoat plating selected from the group consisting of gold, gold alloy, chromium, palladium, palladium alloy, rhodium and ruthenium and combinations thereof with said first hard film deposited on said undercoat plating.

18. The ornamental member of claim 1, wherein the substrate is selected from the group consisting of stainless steel, a ceramic material, a copper alloy, a hard Ni-base alloy, a Co-based alloy, zinc, a zinc alloy and a plastic material.

19. The ornamental member of claim 1, wherein said substrate is SUS 304 stainless steel.

20. The ornamental member of claim 1, wherein said substrate is zinc.

21. The ornamental member of claim 1, wherein said substrate is brass.

* * * * *